United States Patent [19]

Bell

[11] 4,279,442
[45] Jul. 21, 1981

[54] RECLINING SEAT LATCH
[75] Inventor: Robert L. Bell, Oxford, Mich.
[73] Assignee: Fisher Corporation, Troy, Mich.
[21] Appl. No.: 111,600
[22] Filed: Jan. 14, 1980
[51] Int. Cl.³ .............................................. A47C 1/025
[52] U.S. Cl. .................................. 297/367; 297/375; 297/379
[58] Field of Search ................................ 297/363-369, 297/354, 355, 374, 375; 16/139, 140; 292/265-267; 188/67; 74/540-542

[56] References Cited
U.S. PATENT DOCUMENTS

| | | | |
|---|---|---|---|
| 535,999 | 5/1895 | Sargent | 297/375 |
| 625,020 | 5/1899 | Chappnis | 188/67 X |
| 2,066,901 | 1/1937 | Preble | 297/363 X |
| 2,692,788 | 10/1954 | Willis | 292/267 |
| 3,001,821 | 9/1961 | Marechal | 297/366 |
| 3,999,247 | 12/1976 | Cremer | 297/379 X |

FOREIGN PATENT DOCUMENTS

| | | | |
|---|---|---|---|
| 2641587 | 3/1978 | Fed. Rep. of Germany | 297/379 |
| 1433788 | 4/1976 | United Kingdom | 297/368 |

Primary Examiner—William E. Lyddane
Attorney, Agent, or Firm—Harness, Dickey & Pierce

[57] ABSTRACT

The disclosure relates to a mechanism for controlling reclining movement of a vehicle seat back. A pair of pawls are engageable with an articulated slidable ratchet arm to latch the seat at a desired reclining position. The pawls are manually movable to an unlatched condition relative to the ratchet arm under the control of a pair of pawl control plates that both float the arm and positively orientate the pawls relative thereto.

3 Claims, 5 Drawing Figures

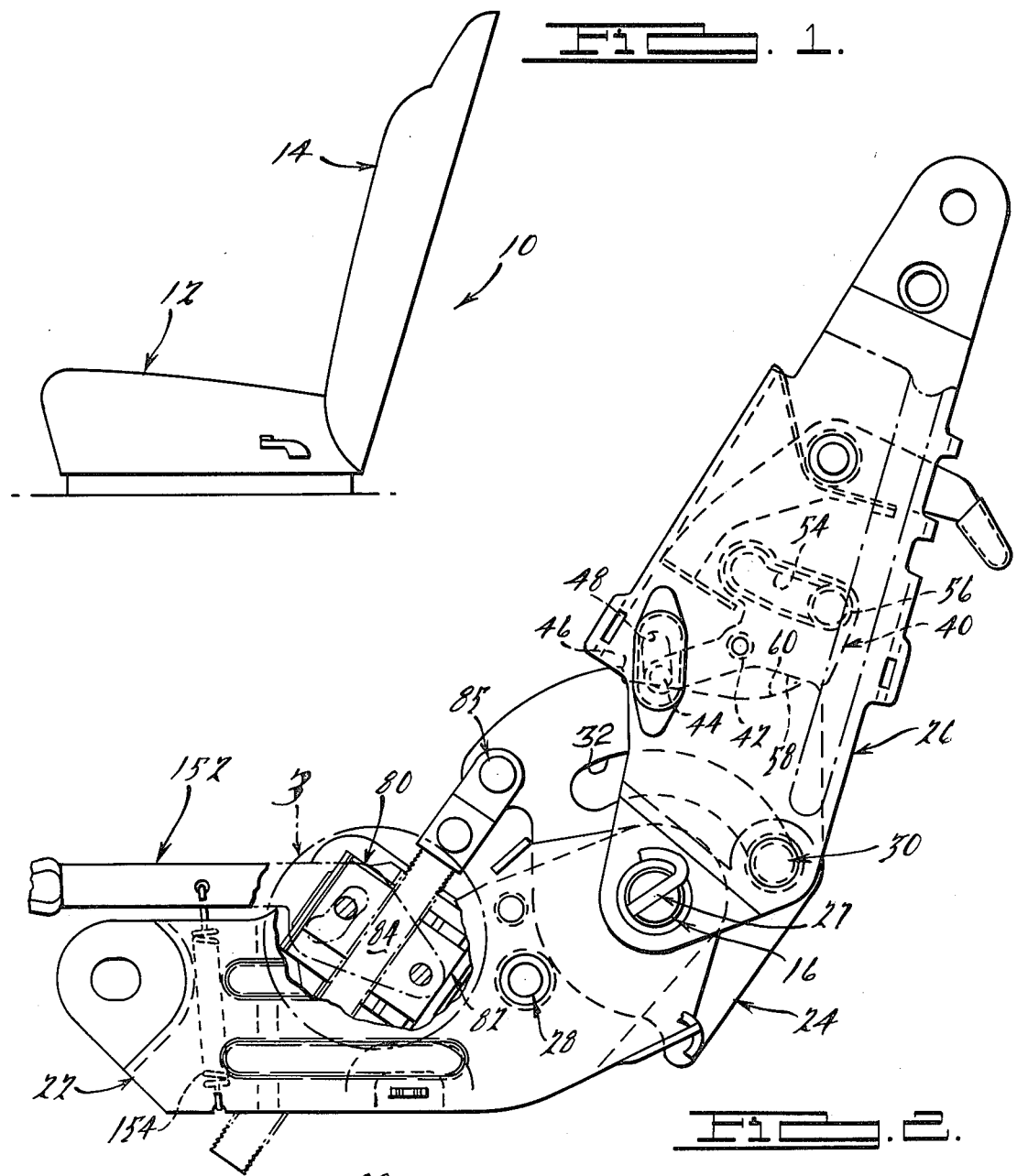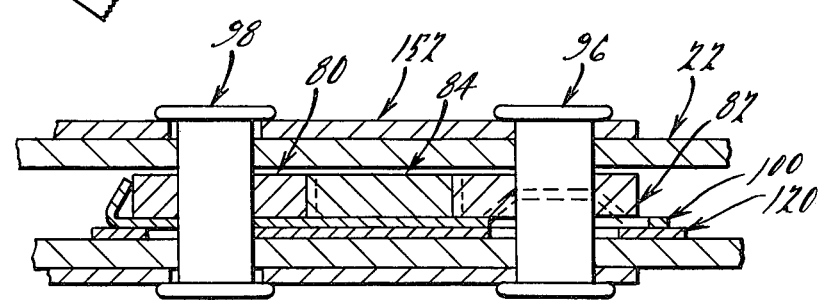

RECLINING SEAT LATCH

BACKGROUND OF THE INVENTION

As discussed in my co-pending application, Ser. No. 19,377, filed Mar. 12, 1979, now U.S. Pat. No. 4,243,264, entitled Reclining Seat Latch, manually operated latch mechanisms for retaining a reclinable back of a vehicle seat in a desired position are known. However, there is constant pressure on the automotive industry to provide latch mechanisms that are more positive, more accessible, lighter, and less expensive than known latch mechanisms.

SUMMARY OF THE INVENTION

A latch mechanism for a vehicle seat in accordance with the instant invention comprises a seat cushion bracket attachable to the seat cushion portion of a vehicle seat. A seat back bracket is attached to the seat back of the seat and is joined and supported for rotation relative to the seat cushion bracket by a pivot pin. A quadrant is supported by the pivot pin for rotation relative to both the seat cushion bracket and the seat back bracket. A slidable ratchet arm having teeth on opposite sides thereof is pivotally connected to the quadrant at a point radially spaced from the pivot pin thereof so as to be articulated relative thereto as well as to be reciprocable and adjustable relative to a pair of manually controlled pawls mounted on the seat cushion bracket. The pawls are engageable with the arm for controlling rotation of the quadrant and seat back. The arm is "floated" between the pawls which are positively orientated relative thereto.

BRIEF DESCRIPTION OF THE DRAWINGS

FIG. 1 is a side elevational view of a vehicle seat embodying the instant invention;

FIG. 2 is an enlarged side elevational view of the latch mechanism of the seat of FIG. 1 with the seat cover broken away and other portions removed so as to show the details thereof;

FIG. 5 is a cross-sectional view taken along the line 5—5 of FIG. 3.

DETAILED DESCRIPTION OF THE PREFERRED EMBODIMENT

Figure 3:
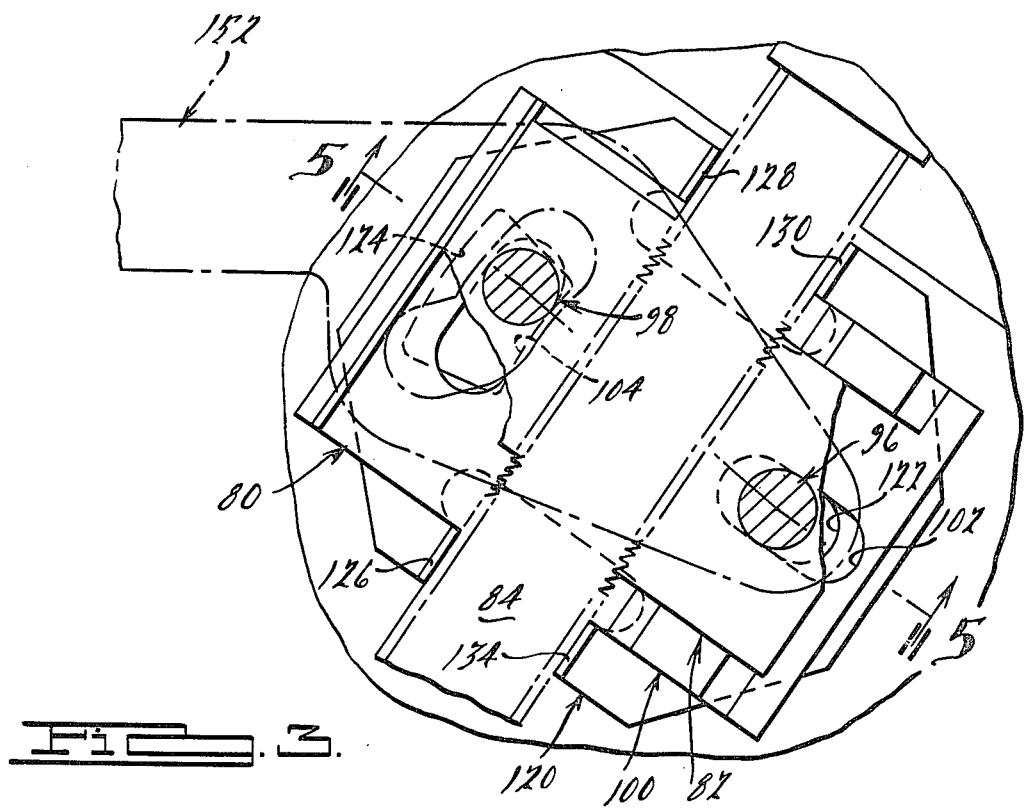
FIG. 3 is an enlarged view taken within the circle "3" of FIG. 2 showing the pawls and arm in the locked condition.

Referring to the drawings, FIG. 1 shows a vehicle seat assembly 10, incorporating a seat recliner in accordance with the present invention. The seat assembly 10 is of the type conventionally found in the front seat of two-door motor vehicles and comprises a seat cushion 12 and a seat back 14.

Referring to FIG. 2, wherein the upholstery of the seat cushion 12 and seat back 14 have been deleted and only the structural components necessary to an understanding of the invention have been illustrated, a seat cushion bracket 22 is affixed to the seat cushion 12. The bracket 22 journals a pin 16 to which a quadrant 24 is secured. A seat back bracket 26 is also journaled on the pin 16. A spring 27 extends between the bracket 22 and pin 16 so as to exert a counterclockwise bias on the pin 16 and quadrant 24.

Clockwise or reclining rotation of the quadrant 24 is stopped by engagement of a pin 30 on the bracket 26 with the end of a slot 32 in the quadrant 24.

As more fully described in my co-pending application entitled Reclining and Emergency Latch Mechanism for Vehicle Seats, filed Sept. 28, 1978, Ser. No. 946,510, now U.S. Pat. No. 4,219,234, which is incorporated herein by reference, an inertia member cage 40 is supported for rotation relative to the seat back bracket 26 by a pivot pin 42. The inertia member cage 40 carries a transversely extending latch pin 44 that is adapted to cooperate with a shoulder 46 on the quadrant 24 and the edges of a slot 48 in the seat back bracket 26 to limit forward rotation of the seat back 14 about the pin 16 upon the occurrence of sudden deceleration of the vehicle.

The inertia member cage 40 is formed with an internal track 54 for the acceptance of a generally disc-shaped inertia member 56 which is rollable therealong.

FIG. 2 shows the seat back and, therefore, the seat back bracket 26, in its normal or latched and upright condition. In this condition, the inertia member 56 is positioned to the right of the pivot pin 42 in which position the weight of the inertia member 56 causes the inertia member cage 40 to be biased clockwise. Clockwise rotation of the inertia member cage 40 is limited by engagement of a shoulder 58 thereon with an abutment 60 on the quadrant 24 thereby normally maintaining the pin 44 in alignment with the shoulder 46 on the clutch quadrant 24 so as to be engageable therewith.

Upon the occurrence of sudden vehicle deceleration, the inertia cage 40 is biased counterclockwise and, concomitantly, the inertia member 56 rolls along the track 54 augmenting the counterclockwise bias on the inertia member cage 40 thereby holding the pin 44 at the lower end of the slot 48 so that it is maintained in a position to engage the shoulder 46 on the quadrant 24. Thus, forward pivotal movement of the seat back bracket 26 relative to the quadrant 24 and the seat cushion bracket 22 is stopped assuming the quadrant 24 is latched relative to the seat bracket 22, as will be described.

The inertia member cage 40 is positively held in the aforesaid latched position by the inertia member 56 until deceleration ceases whereupon the inertia member 56 returns to the position shown in FIG. 2. While the bias on the inertia member cage 40 is clockwise when the seat back 14 is in the normal upright condition, the pin 44 on the inertia member cage 40 is maintained in the locked position shown in FIG. 2, due to engagement of the boss 58 thereon with the abutment 60 on the clutch quadrant 24.

When the vehicle is in the static condition and it is desired to move the seat back 14 forward relative to the seat 12 to facilitate access to the rear seat of the vehicle, the first increment of forward rotation of the seat back 14 permits the inertia member cage 40 to rotate clockwise under the clockwise bias of the inertia member 56. When the cage 40 rotates clockwise, the pin 44 is raised within the slot 48 in the bracket 26 so as to clear the shoulder 46 on the quadrant 24 permitting the seat back 14 to be pivoted forwardly. Thus, the pin 44 is automatically moved out of the normal or latched condition to accommodate forward movement of the seat back 14 when no deceleration forces are operative on the vehicle. At such time the inertia member 56 remains at the right or lowermost portion of its track 54 thereby to exert a clockwise bias on the inertia member cage 40.

In accordance with the instant invention, latching of the seat back 14 at a desired reclining position intermediate the end positions thereof, is achieved by latching of the quadrant 24 relative to the seat cushion bracket 22 and seat 12 due to engagement of a pair of pawls 80 and 82 with a reciprocable articulated ratchet arm 84. The arm 84 is pivotally secured to the quadrant 24 by a pin 85.

Figure 4:
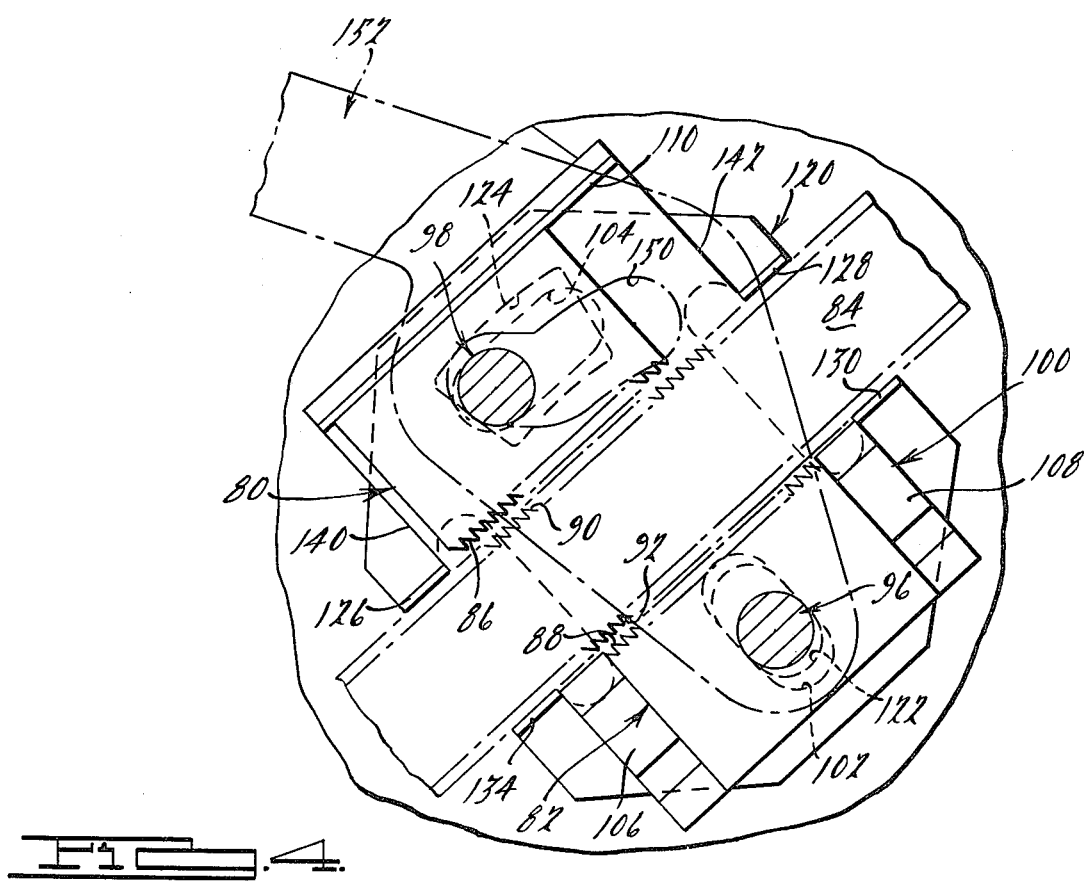
FIG. 4 is a view similar to FIG. 3 showing the pawls and arm in the unlocked condition.

As best seen in FIGS. 3 and 4, the pawls 80 and 82 have toothed portions 86 and 88, respectively, which engage complementary toothed portions 90 and 92 on the arm 84 in meshing engagement. The teeth 86 and 88 on the pawls 80 and 82, respectively, are preferably of buttress configuration and of opposite orientation so that when engaged with complementary buttress teeth 90 and 92 on the arm 84, respectively, reciprocal movement of the arm 84 in either direction longitudinally thereof is positively stopped.

The pawl 82 is supported by a fixed pin 96 on the seat bracket 22 while the pawl 80 is supported by a movable pin 98. Rotation of the pawl 82 is controlled by a frontal pawl locator plate 100 having a slot 102 for the acceptance of the pin 96 and an arcuate slot 104 for the acceptance of the pin 98. Laterally spaced embossements 106 and 108 interact with the pawl 82 and guide the plate 100 for reciprocable translation relative to the pawl 82 and for rotation therewith. It is to be noted that the pawl 82 and plate 100 are rotatable relative to the arm 84 about the pin 96.

The plate 100 has a folded upper edge portion 110 that effects control of the pawl 80 in the sense of precluding rotation thereof relative to the plate 100.

A second pawl locator plate 120 has a slot 122 for the acceptance of the pin 96 and an arcuate slot 124 for the acceptance of the pin 98. The shape and dimension of the slot 124 is such as to permit movement of the plate 120 both radially and circumferentially relative to the pin 96.

The plate 120 has four fingers 126, 128, 130 and 134 orientated in a rectangular array for control of the arm 84, which is positioned thereby but is freely slidable therebetween. Thus, the plate 120 is at all times "floated" upon the teeth of the link 84 and vice versa.

The fingers 126 and 134 serve a second function in that they are engageable with an edge portion 140 of the plate 100 and the fingers 128 and 130 are engageable with an edge portion 142 of the plate 100. Thus, since the fingers 126, 128, 130 and 134 on the locator plate 120 positively position the locator plate 120 relative to the arm 84, it follows that the locator plate 100 is also positively located relative to the arm 84 in the sense of the edge portions 140 and 142 being maintained at a right angle to the axis of reciprocation of the arm 84.

In the normal locked condition the movable pin 98 is biased toward the pin 96 by interaction of the wall of a slot 150 in a manual operator 152 with the pin 98. The manual operator 152 is journaled for rotation by the pin 96. The manual operator 152 is normally biased counterclockwise toward the locked condition by a spring 154.

Since the pins 96 and 98 locate the pawls 80 and 82 relative to one another, the bias on the pins 96 and 98 toward one another effects engagement of the teeth 86 on the pawl 80 with the teeth 90 on the arm 84, as well as engagement of the teeth 88 on the pawl 82 with the teeth 92 on the arm 84.

To effect unlocking of the seat back 14 and reclining movement thereof, the manual operator 152 is rotated clockwise about the pin 96 thereby carrying the pin 98 and pawl 80 upwardly due to interaction of the sidewall of slot 150 in the manual operator 152 with the pin 98. Movement of the pin 98 upwardly frees the teeth 86 on the pawl 80 from the teeth 90 on the arm 84. Upward movement of the pin 98 also carries the locator plate 100 upwardly due to engagement of the pin 98 with the upper edge of the slot 104 in the plate 100. Subsequently, the pin 98 engages the top of the slot 124 in the plate 120 carrying the plate 120 and arm 84 upwardly relative to the pin 96 thereby to disengage the teeth 92 on the arm 84 from the teeth 88 on the pawl 82.

From the foregoing, it should be apparent that the latch mechanism of the instant invention provides for relatively smooth and positive locking of the ratchet arm 84 by the pawls 80 and 82, since the pawls 80 and 82 are positively orientated relative to the arm 84 and, in effect, "floated" relative thereto in the unlocked condition. The relative movement provided for between the pawls 80 and 82 as well as between the plates 100 and 120 insure that the teeth 86 and 88 of the pawls 80 and 82 smoothly mesh with the teeth 90 and 92 of the arm 84 in a manner that precludes stripping thereof incident to locking or cocking thereof due to loads on the arm 84.

While the preferred embodiment of the invention has been disclosed, it will be appreciated that the invention is susceptible to variation without departing from the scope of the claims.

What is claimed is:

1. A latch mechanism for controlling rotation of a vehicle seat back to a reclining position relative to a vehicle seat, said mechanism comprising
   a pivot pin joining said seat and seat back for relative rotation,
   a quadrant secured to said pivot pin for rotation relative to both said seat and seat back,
   stop means on said quadrant for defining the position of said seat back relative to said quadrant,
   an arm extending between said seat and said quadrant for controlling the position of said quadrant, said arm being pivotally connected to said quadrant at a point radially spaced from said pivot pin and having spaced teeth on opposite sides thereof,
   a manual operator pivoted on a first pin on said seat and having a slot therein spaced from the first pin for the control of a second pin,
   a pair of spaced pawls on said first and second pins having teeth complementary to the teeth on said arm, said pawls being movable relative to said arm to effect engagement and release thereof, whereby said arm is latchable against movement when said pawls are engaged therewith and movable when released to position said quadrant and seat back at a desired rotational position relative to said seat,
   a first pawl control plate mounted on said first pin for rotation and reciprocation relative thereto, and
   a second pawl control plate having a plurality of fingers engaged with said arm in slidable relationship for controlling the position of said arm, movement of said second pin effecting movement of said second pawl control plate and said arm away from said first pin.

2. A latch mechanism in accordance with claim 1 including means on said first pawl control plate for controlling rotation of said second pawl.

3. A latch mechanism in accordance with claim 2 including means on said second pawl control plate for controlling movement of said first pawl control plate.

* * * * *